May 12, 1964   C. P. J. SUVERKROPP   3,133,180
OVEN APPARATUS FOR TESTING ELECTRICAL COMPONENTS
Filed July 2, 1962   4 Sheets-Sheet 4

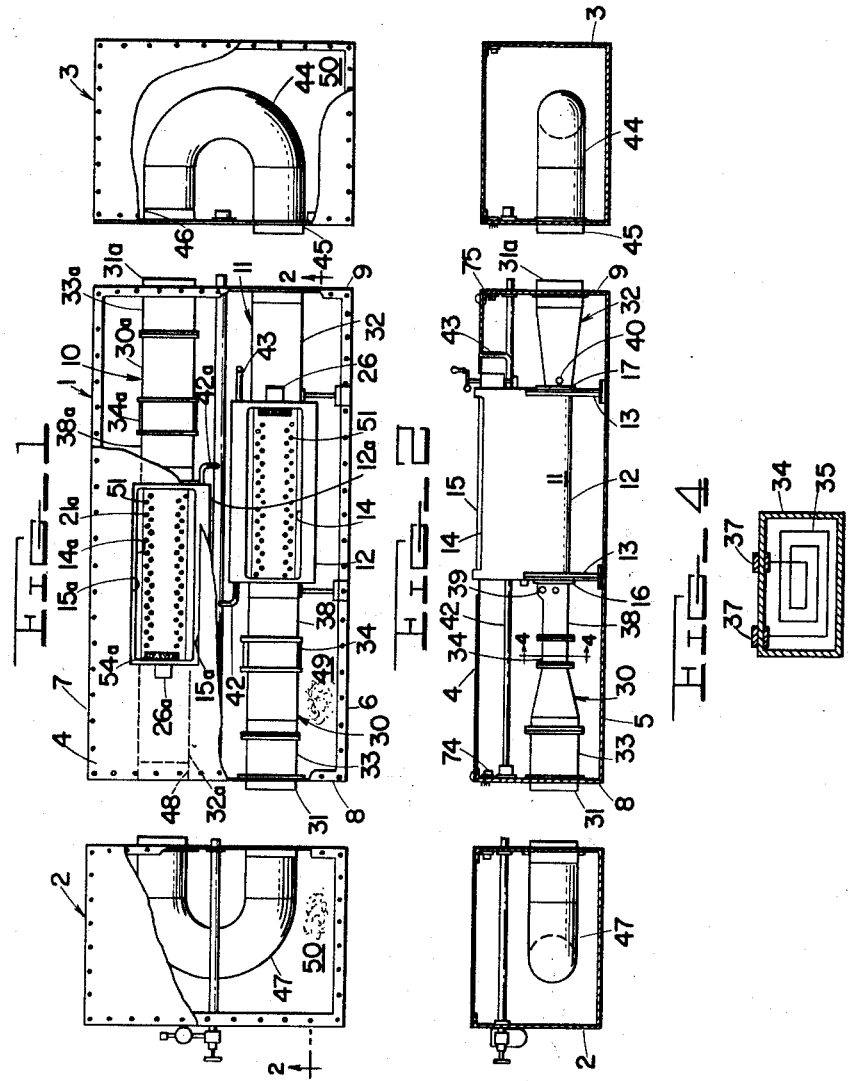

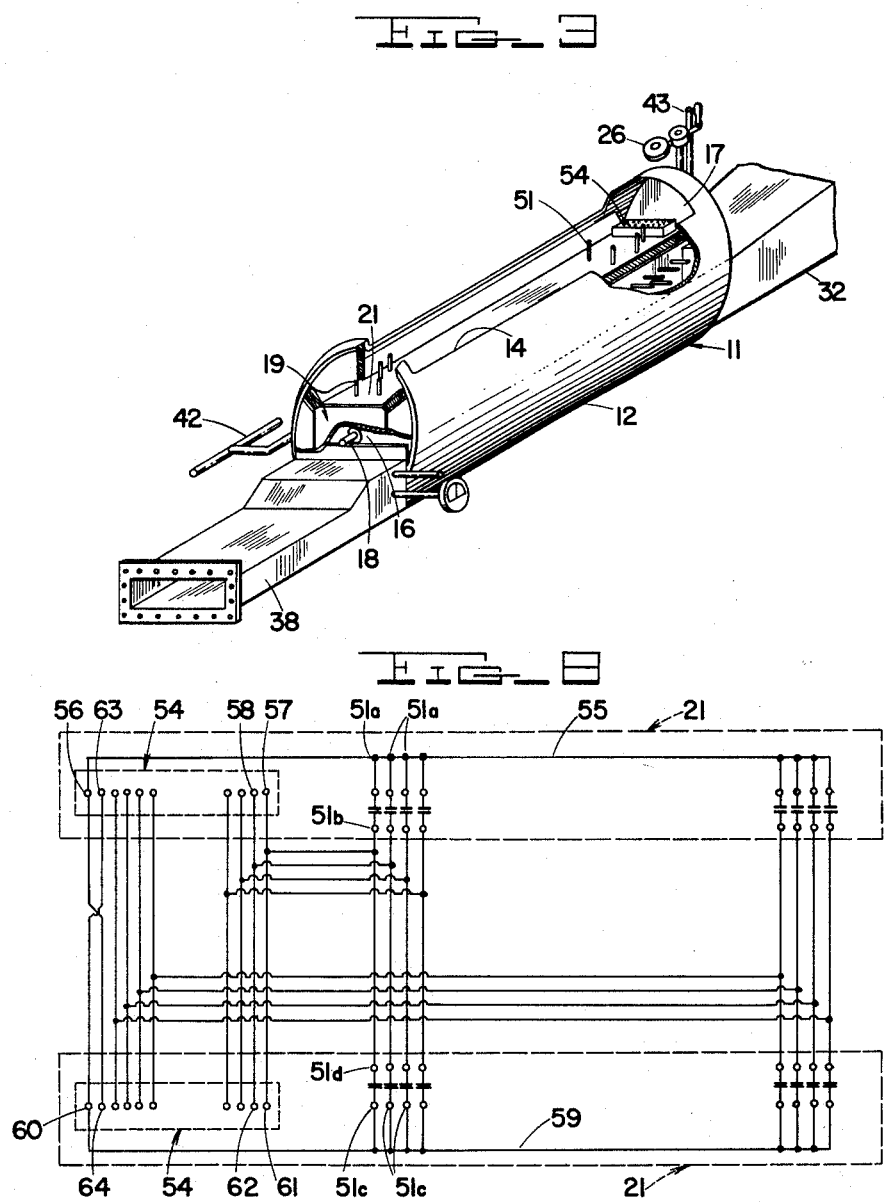

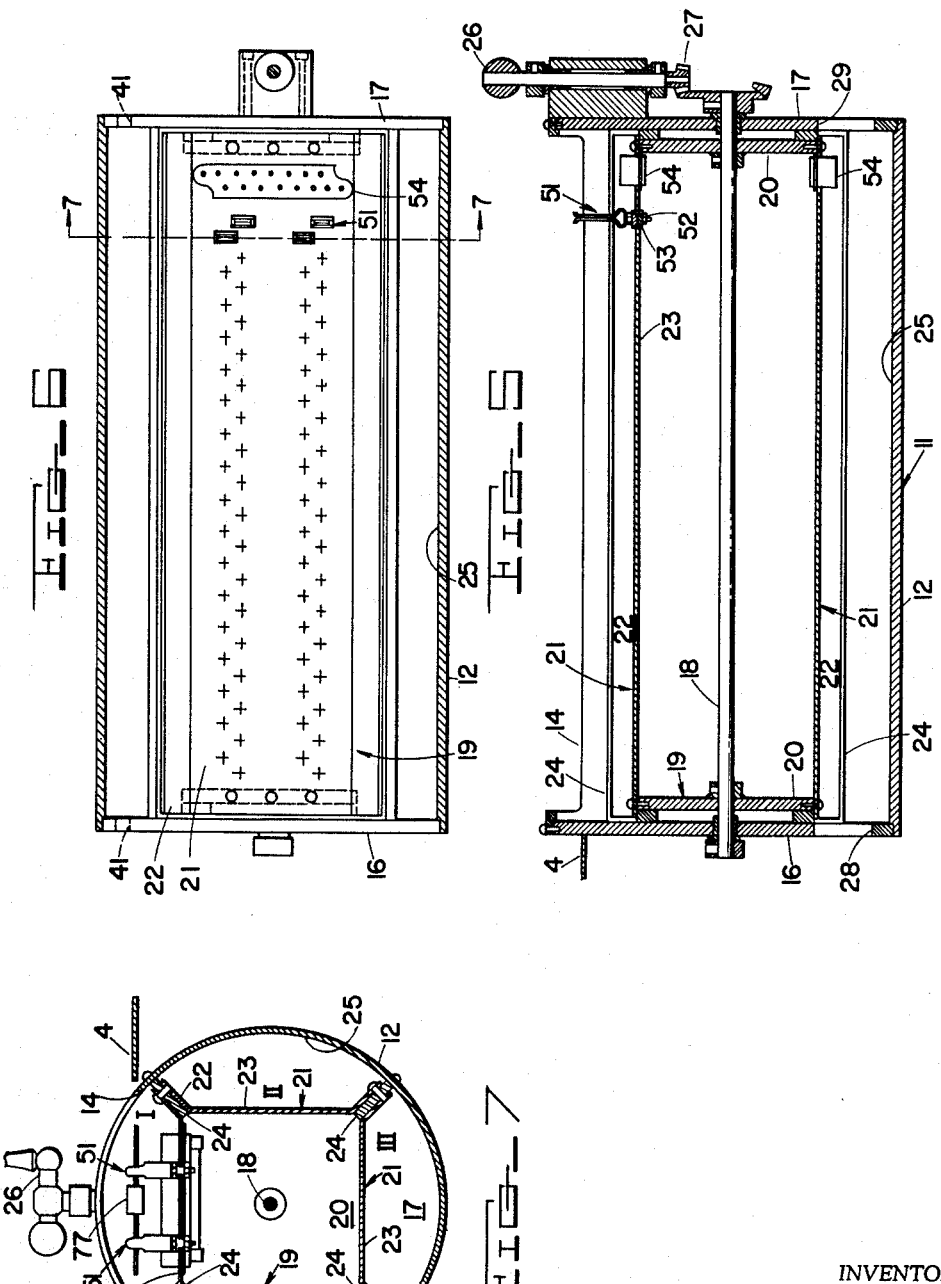

INVENTOR.
CLAUS P. J. SUVERKROPP
BY Percy P. Lantzy
ATTORNEYS

United States Patent Office 3,133,180
Patented May 12, 1964

3,133,180
OVEN APPARATUS FOR TESTING
ELECTRICAL COMPONENTS
Claus P. J. Suverkropp, Sunnyvale, Calif., assignor to International Telephone and Telegraph Corporation, Nutley, N.J., a corporation of Maryland
Filed July 2, 1962, Ser. No. 206,717
6 Claims. (Cl. 219—35)

The present invention relates to an oven apparatus for testing electrical components and more particularly to unique apparatus for conducting electrical tests on mass-production volumes of such components under controllable temperature conditions.

Electrical components, such as transistors, capacitors, inductors, resistance diodes and the like, are manufactured in mass production quantities and as a part of the manufacturing processes must usually be inspected or tested as to quality and performance. Such components are expected in use to operate properly under different temperature conditions. Therefore, it becomes advisable, and in many instances necessary, to perform tests as a part of the manufacturing process which check the performance of the components while being subjected to different temperatures. This usually involves the coupling of the components into an electrical testing circuit while simultaneously varying the temperature thereof in accordance with a predetermined procedure, both of these steps requiring a certain amount of expense and time in the performance thereof.

In an effort to maintain the time and expense of temperature testing to a minimum, production test equipment utilized for this purpose should be simple and easy to use, economical in operation, and have a capacity for volume testing of components. Since production schedules vary from day to day, it is also desirable that such test equipment have the facility of being easily and particularly adapted to any particular schedule such that efficiency of operation can be maintained at a maximum at all times.

It is therefore an object of this invention to provide apparatus for testing the quality and performance of electrical components under conditions of different temperatures.

It is another object of this invention to provide apparatus for heat treating electrical and the like components whereby the temperature of the components may be elevated and lowered in discrete steps.

It is still another object of this invention to provide apparatus for testing electrical components in production volume in a facile, economical and efficient manner.

It is yet another object of this invention to provide heat-testing apparatus which is susceptible of having its volume-handling capacity easily altered while maintaining ease of operation and conservation of heat.

Other objects will become apparent as the description proceeds.

In the accomplishment of this invention, there is provided an oven apparatus for testing electrical components comprising a supporting housing having top, bottom, side and opposite end walls. Two oven devices are fixedly mounted inside this housing in side-by-side relationship, each oven device comprising a metallic enclosure of cylindrical shape having opposite end walls. A carrier is coaxially mounted in this enclosure for rotation about the axis thereof. The carrier is provided with four axially extending, equally circumferentially spaced radial walls which slidably engage the inner wall surface of the enclosure for the full distance between the enclosure end walls, thereby providing four circumferentially spaced compartments within the enclosure. The compartments each have a floor therein which is secured to the respective radial walls thereof, and further the enclosure is provided with an access opening which is sequentially registrable with the individual ones of said compartments as the carrier is rotated. The enclosure end walls have axially opposite inlet and exhaust openings therein, respectively in registry with a one of said compartments which is not in registry with the access opening, said inlet and exhaust openings being disposed diametrically opposite the access opening. There are two axially aligned cooling-air ports in the enclosure end walls which are registrable only with one compartment disposed between the access opening and the inlet and exhaust openings, the other compartment between the access opening and said inlet and exhaust openings being fully closed. Intake and exhaust ducts are connected to said inlet and exhaust openings, respectively. A heater and blower mechanism is mounted in the intake duct, and the ducts and the enclosure extend in a straight line configuration, or in other words are colinear.

Two such oven devices are mounted in the supporting housing in parallel relationship but reversely arranged with the intake and exhaust ducts thereof being juxtaposed in pairs. One pair of intake and exhaust ducts open through one end wall of the housing while the other pair of intake and exhaust ducts open through the other end wall of the housing. Two openings provided in the top wall of the housing register with the access openings, respectively, of the two enclosures, and means are provided on the housing for rotating selectively the carriers of the two oven devices.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a top plan view of one embodiment of this invention;

FIG. 2 is a side elevation in section thereof taken along lines 2—2 of FIG. 1;

FIG. 4 is a cross-sectional illustration taken substantially along section line 4—4 of FIG. 2 showing a typical method of installing a heater element in the intake duct;

FIG. 5 is an upright longitudinal axial section of the rotary oven assembly of FIGS. 1, 2 and 3;

FIG. 6 is a top view of the assembly of FIG. 5 partly sectioned to reveal one oven compartment;

FIG. 7 is a cross-sectional view taken substantially along section line 7—7 of FIG. 6;

FIG. 8 is a wiring diagram of the electrical circuitry connected to the various oven compartments for testing electrical components; and FIG. 9 is a circuit diagram illustrating the various electrical connections and components for operating the blower and heating devices employed in the apparatuses of FIGS. 1, 2 and 3.

Figure 3:
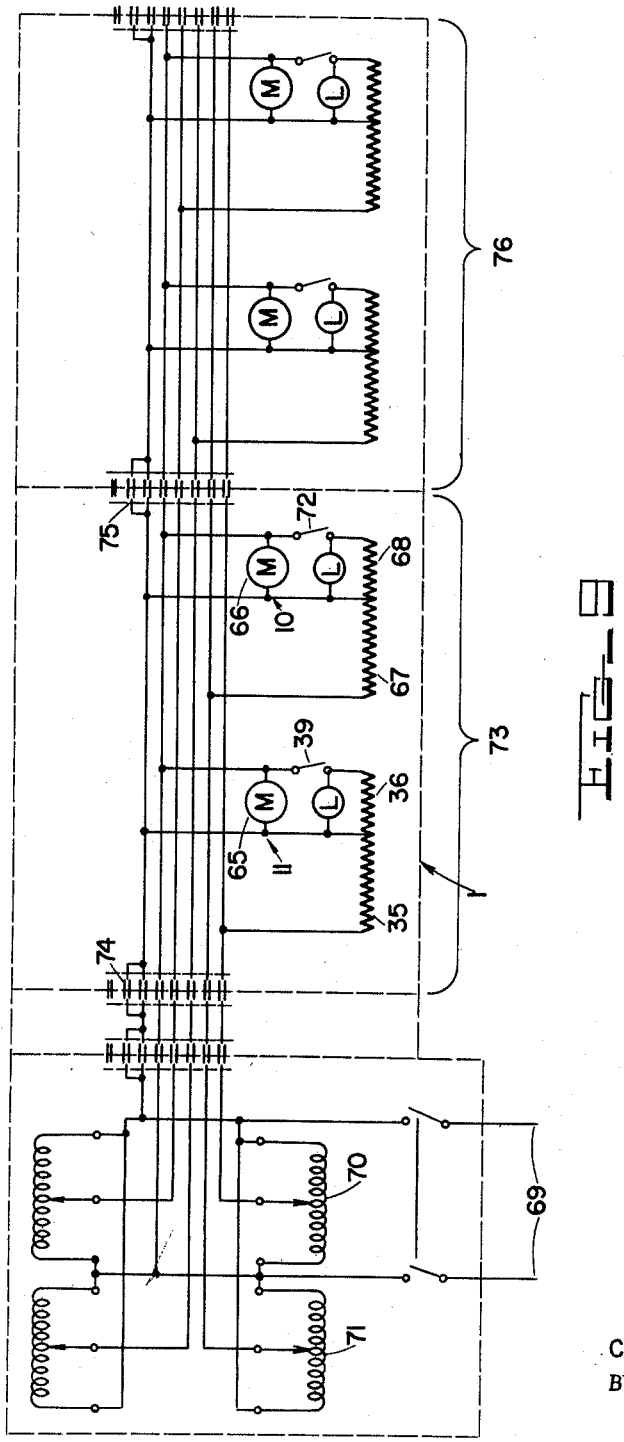
FIG. 3 is a perspective illustration of a portion of the apparatus of FIGS. 1 and 2 partially sectioned.

Referring to the drawings, and more particularly to FIGS. 1 and 2, the former being a top plan view of an embodiment of the invention and the latter being a side elevation view in section taken along lines 2—2 of FIG. 1, the apparatus there shown is disassembled but in proper position for immediate assembly. As shown, the apparatus includes a central heating section or oven apparatus 1 to the ends of which may be detachably connected two end sections 2 and 3, respectively. Referring to the module 1 first, it comprises a frame or housing having top and bottom walls 4 and 5, respectively, side walls 6 and 7, and opposite end walls 8 and 9, respectively. In a working embodiment of this invention, the housing is preferably fabricated of heat-resistant metallic frame and wall members, the various walls being formed of sheet metal of suitable gauge having various openings which will be explained more fully later on.

Mounted inside the housing are two, preferably identical, oven devices, which are indicated generally by the numerals 10 and 11, respectively. Since these two oven devices are of substantially the same construction but are reversely arranged in the housing, a description of one will suffice for both. Duplicate reference numerals will serve to indicate like parts, the suffix "a" being used in connection with the parts of the oven device 10.

Considering the oven device 11 which is shown in the FIGS. 1, 2 and 3, it comprises a cylindrical or tubular shell 12 which is fixedly supported inside the housing 1 by means of suitable upright frame members 13 which are secured to the sides of the shell 12 at one end portion and to the floor 5 of the housing at the other end portion. The upper portion of the shell 12 is provided with an access opening 14 which extends for substantially the entire length of the shell 12 and for a width which will become apparent from the description to follow. This access 14 is disposed in registry with another rectangular opening 15 in the cover 4 of the housing 1.

Referring more specifically to FIGS. 3, 5, 6 and 7, the shell or enclosure 12 is provided with opposite solid end walls 16 and 17, respectively, with a shaft 18 being coaxially journaled therein. On this shaft 18 is mounted for rotation therewith a carrier indicated generally by the reference numeral 19, this carrier comprising two, square opposite end plates 20 having secured thereto four axially extending, sheet-metal tray members 21 which are shown in cross-section in FIG. 7. These tray members 21 have radially outwardly extending sides 22 and flat bottoms 23, the sides 22 of adjacent tray members 21 being spaced apart and parallel as shown in FIG. 7 and having clamped therebetween flat straight bar portions 24 which slidingly engage along the outer edge thereof the inner peripheral surface 25 of the cylindrical enclosure 12. Also, these bars 24 extend for substantially the entire length of the shell 12, terminating immediately adjacent the end walls 16.

As shown more clearly in FIG. 7, there are four such assemblies 22, 24 in quadrature relation, each assembly constituting a wall portion which extends radially outwardly from the shaft 18 as a center.

As is obvious from FIG. 7, this assembly of tray members 21 in combination with the cylindrical shell 12 provides four compartments I, II, III and IV which are also in quadrature relation. It may now be noted, again viewing FIG. 7, that the widths of the two access openings 14 and 15 are substantially equal to the width dimension of the tray member 21 in the position of compartment I. Means are provided for manually rotating the carrier 19 and its tray members 21, this means in the illustrated working embodiment of this invention being a crank 26 and gear assembly 27 which are connected to the right-hand end of the shaft 18 as shown in FIG. 5. Any suitable means for rotating the carrier and tray members into coincidence with the particular compartments as already described may be used, however, without departing from the scope of this invention.

As more clearly shown in FIGS. 5 and 7, the end walls 16 and 17 of the shell 12 are provided with inlet and exhaust openings 28 and 29, respectively, which are axially aligned and in registry with the compartment indicated by numeral III. In other words, these openings 28 and 29 do not communicate with any of the other three compartments I, II and IV.

As shown in FIGS. 1, 2 and 3, a conduit or intake duct generally indicated by the numeral 30 is connected to the end plate 16 in registry with the inlet opening 28, with the left-hand end of the duct 30 projecting through and slightly beyond the housing wall 8 to provide a nipple extension 31. An exhaust conduit or duct 32 is terminated at its right hand and flush with house wall 9 and, at its left hand, is connected to end wall 17 of shell 12 in registration with exhaust opening 29 (FIG. 2). The two ducts 30 and 32 with the cylindrical shell 12 connected therebetween are arranged in a straight line or colinearly as shown.

In the larger portion 33 of the intake duct 30 is mounted a blower composed of an electric motor 65 (FIG. 9) and fan whereby air may be forced in a rightward direction through the duct 30, compartment III of the cylindrical shell 12 and out of the exhaust duct 32. Fixedly mounted in the smaller portion 34 of the intake duct 30 are two electrical heaters 35 and 36, these heaters being formed of suitable electrical resistance material which heats in response to current passing therethrough. In FIG. 4 is illustrated in cross-section a typical mounting arrangement for the heater 35, suitable feed-through insulators 37 accommodating the two end leads of the heater 35 for passage through the walls of the conduit portion 34. By means of the heaters 35 and 36, the air which is forced through the duct 30 by means of the blower mechanism in the duct portion 33 may be elevated in temperature.

Mounted in the duct portion 38 immediately adjacent to the end wall 16 is a thermostatic regulator 30 which is in direct contact with the heated air inside the intake duct 30 after it has been heated by the heaters 35 and 36. A thermometer 40 is inserted in the left-hand end of the exhaust duct 32 immediately adjacent the end wall 17 for providing an indication of the air temperature as it leaves the exhaust opening 29 of the cylindrical shell 12.

Two ports 41 are provided in the two end plates 16 and 17, as shown more clearly in FIGS. 6 and 7, in axially opposite positions in registry with the compartment IV. To these ports 41 are connected two pipes 42 and 43, respectively, the pipe 42 carrying cool air into the compartment 4 and the pipe 43 permitting it to exhaust therefrom. Some means is preferably provided for forcing a cooling stream of air through the pipe 42.

Having now completely described the structure of oven device 11 it may now be stated that the oven device 10 as viewed in FIG. 1 is constructed substantially identically thereto and is mounted in the housing 1 in parallelism with the oven device 11 but in reverse arrangement with respect thereto.

For connecting the exhaust duct 32 to the intake duct 31a, a U-shaped conduit 44 in the end section or housing 3 is coupled thereto. A nipple 45 on the conduit 44 fits into the end of the exhaust duct 32 while the nipple 31a fits into the end 46 of the conduit 44 for completing the connection between the two ducts 30a and 32.

In identical fashion, a U-shaped duct 47 connects to the ends 31 and 48 of the two ducts 31 and 32a. It will now be seen that a closed air-circulating system is provided wherein the same air or gas that circulates through the oven device 10 also passes through the oven device 11.

For the purpose of reducing heat losses to a minimum, rock wool insulation or the like 49 may fill the housing 1 around the oven devices 10 and 11 as also may insulation 50 around the two U-shaped conduits 44 and 47 in the end housings 2 and 3, respectively. Also, rock wool insulation may be provided inside the space defined by the tray members 21 around the shaft 18 (FIG. 7).

To the floor 23 of each tray member 21 is fastened a plurality of spring connectors 51 (FIGS. 5 and 7) by means of suitable screw and nut assemblies 52 which are insulated from the floor 23 by insulating washers 53. There are a multiplicity of these spring connectors 51 spaced throughout each tray member 21 as shown diagrammatically in FIGS. 1 and 6 for a purpose which will be explained more fully hereinafter. Also mounted in each tray 21 is a multiple lead socket connector 54 which serves a purpose to be explained more fully hereinafter. All these spring connectors 51 and socket connectors 54 are wired together according to the circuit diagram of FIG. 8 wherein it will be noted that the various lateral pairs of connectors 51 in two diagrammatically opposite trays 21 are connected in different but identical circuits to respective ones of the terminals in the socket connectors 54. In the wiring diagram of FIG. 8, the various terminals 51 are indicated by the same numeral with the letter suffixes. Also, it should be noted that there are two such circuits as illustrated in FIG. 8, these two circuits being directly associated with two, diametrically opposed trays 21. In other words, with respect to FIG. 7, the two trays defining compartments I and III are wired together while the two trays defining the compartments II and IV are wired together.

In one of the trays 21, all of the terminals 51a along one longitudinal edge of the tray are connected to a common buss bar 55 which in turn is connected to a terminal 56 of the connector 54. The other terminals 51b along the opposite longitudinal edge of the same tray 21 are connected to respective individual terminals 57, 58, etc., as shown, of the connector 54.

In the opposite tray 21, the connectors 51c along one longitudinal edge thereof are all connected to a common buss bar 59 which in turn is connected to a terminal 60 of the respective connector 54. The other connectors 51d on the opposite longitudinal edge of the same tray are individually connected to respective terminals 61, 62, etc. of the connector 54 as shown. Then, the individual connectors 51b and 51d are wired together as shown.

The terminal 60 of one connector 54 is wired to a terminal 63 on the other connector 54. Similarly, the terminal 56 of this latter connector 54 is wired to a terminal 64 of the other tray connector 54.

Thus, the terminals 56 and 57 of the one connector 54 constitute connections to the two terminals 51a and 51b as shown. Similarly, the two terminals 57 and 63 of the same connector 54 constitute connections to the two terminals 51c and 51d in the opposite tray member 21. Thus, by virtue of the single socket connector 54 on the upper tray of FIG. 8, connections may be made to the connectors 51 in the upper tray 21 or to the other connectors 51 in the lower tray 21. The connectors 51 in the opposite trays 21 are cross-connected such that irrespective of which socket connector 54 may be accessible through the access openings 14 and 15 (FIG. 7), connections are available to the connectors 51 in either of the two compartments I and III, respectively.

The wiring diagram for the electrical circuitry which controls the operation of the blower and heating mechanisms mounted inside the intake ducts 30 and 30a is shown in FIG. 9 wherein blower motor 65 is associated with the oven device 11 and blower motor 66 with the oven device 10. Also, the heaters 35 and 36 are mounted in the oven device 11 while the heaters 67 and 68 are mounted in the oven device 10. In this circuitry, the blower motors 65 and 66 are all connected across the power line 69. However, the voltages applied to the two heaters 35 and 67 are controlled by two variable transformers 70 and 71, respectively. The two heaters 36 and 68 are respectively connected across the power line 69 but with temperature responsive or thermal switches 39 and 72 being respectively connected in series therewith. The heaters 35 and 67 are relied upon to provide the bulk of the heat required in raising the temperature of the air circulated through the intake ducts 30 and 38, respectively, while the two heaters 36 and 68 provide the necessary additional heat for regulating this temperature under the control of the thermo-switches or thermostats 39 and 72.

That portion of the circuitry indicated by the bracket 73 is contained within the housing 1 and terminates on the opposite ends 8 and 9 of the housing in the male and female connectors 74 and 75, respectively (see FIG. 2). That portion of the circuitry indicated by the bracket 76 is a substantial duplicate of that in the bracket 73, and is that circuitry contained in another oven apparatus or module identical to that module 1 already described.

It may now be stated that as many module 1's may be used in a string or series as may be necessary, these modules being connected together with the respective exhaust and intake ducts 30 and 32 being connected together with the endmost modules having end sections 2 and 3 connected thereto for closing the circulatory system. These modules may be considered as plugging one into the other whereby all of the necessary electrical and air-circulating systems may be connected together. Hence, either one, two or more modules may be used in any given system as may be desired at any particular time.

The operation of the apparatus thus far described will now be explained. Let it be assumed that the electrical components to be tested are condensors 77 as shown in FIG. 7. Also let it be assumed that only one module 1 with the two end sections 2 and 3 connected thereto is to be used. In starting operation, the circuitry of FIG. 9 is operated to energize the blowers and heaters in the two oven devices 10 and 11. Air, or any other suitable gas which may be used, is forced by the blower through the intake duct 30, compartment III of the shell 12, and out of the exhaust duct 32 from which it is conducted through the end section 3 into the intake duct 30a in which the blower picks up the same air and forces it onwardly through the compartment III of the shell 12a from which the air passes through the exhaust conduit 32a, the end section 2 and into the intake duct 30 where a return trip is started. Thus, both oven devices 10 and 11 supply both heat and force to the circulating air which is being passed through the respective compartments III thereof.

Viewing FIG. 7, compartment I is always open to the atmosphere; therefore, it is always at room temperature. Compartment III, on the other hand, will always be at an elevated temperature as determined by the respective heaters in the duct system. Compartment II, on the other hand, will be heated to a temperature somewhere in between that of the temperatures of compartments I and III; hence, compartment II serves the purpose of preheating any components which might be mounted therein. In contrast, compartment IV is for cooling any components therein, the cooling effect being supplied by the pipes 42 and 43 through which cooling air is circulated.

With the equipment operating at the selected temperatures, the particular tray 21 in registry with the access openings 14 and 15 is loaded with a plurality of capacitors 77 (FIG. 7) which make connections with laterally opposite pairs, respectively, of connectors 51. When this tray is filled, the crank 26 is operated to rotate the carrier 19 clockwise as viewed in FIG. 7 until the loaded tray occupies the position of compartment 2. While in this compartment, these components will be preheated by virtue of conduction of heat from compartment III through the metal of the shell 12. The empty tray 21 now in the compartment I is loaded with capacitors 77 following which the crank 26 is operated once again to move the trays by 90° wherein the first loaded tray is now located in quadrant III and the second loaded tray is now located in compartment II. The capacitors in compartment III will now be heated to the elevated temperature thereof. While at this elevated temperature, electrical connections to these capacitors may be made by means of the socket connector 54 in the tray of compartment I for testing the capacitors for leakage, capacity and the like. Once this testing has been completed, the crank 26 is operated to again move the trays by 90°, moving another loaded tray from compartment II into compartment III and the previously loaded tray of compartment III into compartment IV. In compartment IV, the heated components are cooled off by the cooling stream of circulating air while the newly loaded tray moved to compartment II will be preheated.

Finally, the crank 26 is operated to move the cooled tray from compartment IV back to compartment I where the tested components are unloaded and a new batch of components substituted therefor.

According to one testing procedure, the capacitors are tested under two different temperature conditions, one being at room temperature while they are in compartment I and the other being at the elevated temperature of compartment III. The moment the tray in compartment I is loaded with a new batch of capacitors, suitable connections are made to the socket connector 54 in the same compartment which checks the various characteristics of these capacitors, as may be desired, at room temperature. Immediately following this test procedure and before rotating the crank 26 to move the various trays to a new quadrant position, different connections are made to the connector 54 in compartment I for checking the characteristics of the various capacitors which are heated in compartment III. Thus, each time the tray assembly is rotated 90°, two measurements are conducted through the access openings 14 and 15 by means of the socket connector 54 which is there accessible, these measurements being of the newly loaded capacitors in compartment I at room temperature and the heated capacitors in compartment III at elevated temperature.

The loading and unloading of the capacitors as well as the testing thereof can obviously be performed at a rapid rate by a skilled operator therby reducing to a minimum the amount of time required in making the tests.

From the foregoing explanation, it will be apparent that the apparatus may be expanded or reduced in size by merely adding or reducing the number of modules 1 which are assembled together. Such flexibility affords tailoring the apparatus to precise production schedules thereby optimizing the testing capacity of the apparatus with a maximum of heat conservation.

At no time during operation of the equipment is the space of compartment III ever exposed to the outside atmosphere, this feature minimizing heat loss and providing temperature stability.

The two intermediate compartments II and IV allow the components under test to preheat before entering the heat zone of compartment III and to cool before re-entering the loading zone of compartment I. Also, the loading compartment I provides an easy, unobstructed access for loading and unloading of the components and use of the particular socket connector 54 which is in compartment I at the particular time.

For convenience in describing the foregoing embodiment of this invention, the compartments I, II, III and IV have been indicated as occupying only the positions illustrated in FIG. 7, but these compartments may be considered as being rotatable and thereby movable to the various positions of the numerals I through IV.

While I have described above the principles of my invention in connection with specific apparatus, it is to be clearly understood that this description is made only by way of example and not as a limitation to the scope of my invention.

What is claimed is:

1. An oven apparatus for testing electrical components comprising two oven devices mounted on a common support, each oven device comprising a cylindrical enclosure having opposite end walls, a carrier coaxially mounted in said enclosure for rotation about the axis thereof, said carrier having a plurality of axially extending circumferentially spaced radial walls which slidingly engage the inner wall of said enclosure between said end walls thereby providing a plurality of circumferentially spaced compartments within said enclosure, said enclosure having an access opening therein which is sequentially registrable with individual ones of said compartments as said carrier is rotated, said end walls having axially opposite inlet and exhaust openings therein, respectively, in registry with a one of said compartments which is not in registry with said access opening, intake and exhaust ducts connected to said inlet and exhaust openings, respectively, a heater and blower mechanism mounted in said intake duct for heating and directing a gas through the compartment which is registered with said inlet and exhaust openings; the ducts and enclosures of each oven device being colinear, said two oven devices extending in parallel directions but in reverse with the intake and exhaust ducts thereof being juxtaposed, and means for connecting adjacent intake and exhaust ducts together for providing a closed circulating system.

2. An oven apparatus for testing electrical components comprising a cylindrical enclosure having opposite end walls, carriers coaxially mounted in said closure for rotation about the axis thereof, said carrier having a plurality of axially extending circumferentially spaced compartments within said enclosure, said enclosure having an access opening therein which is sequentially registrable with individual ones of said compartments as said carrier is rotated, said end walls having axially opposite inlet openings therein, respectively, in registry with one of said compartments which is not in registry with said access opening, intake and exhaust ducts connected to said inlet and exhaust openings, respectively, a heater and blower system mounted in said intake duct for heating and directing a gas through the compartment which is registered with said inlet and exhaust openings being disposed diametrically with said access opening, said end walls being further provided with axially aligned cooling-air ports in a location circumferentially between said inlet and exhaust openings and said access opening and in registry with a one of said compartments which is not in registry with said access opening and said inlet and exhaust openings, said plurality of compartments comprising four carrier compartments in quadrature relation which have operative positions wherein one compartment is registered with said access opening, a second compartment is registered with said inlet and exhaust openings, a third compartment is closed and registered between said first and second openings, and a fourth compartment is situated diametrically opposite said third compartment in registry with said cooling-air parts, each carrier compartment having at least two electrical component retaining devices mounted on a carrier wall thereof insulated from each other, and connection means mounted on said carrier wall for selectively applying electrical power to the component retaining devices of said compartments when they occupy the first and second positions of said compartments.

3. An oven apparatus for testing electrical components comprising a cylindrical enclosure having opposite end walls, carriers coaxially mounted in said closure for rotation about the axis thereof, said carrier having a plurality of axially extending circumferentially spaced compartments within said enclosure, said enclosure having an access opening therein which is sequentially registrable with individual ones of said compartments as said carrier is rotated, said end walls having axially opposite inlet openings therein, respectively, in registry with one of said compartments which is not in registry with said access opening, intake and exhaust ducts connected to said inlet and exhaust openings, respectively, a heater and blower system mounted in said intake duct for heating and directing a gas through the compartment which is registered with said inlet and exhaust openings being disposed diametrically with said access opening, said end walls being further provided with axially aligned cooling-air ports in a location circumferentially between said inlet and exhaust openings and said access opening and in registry with a one of said compartments which is not in registry with said access opening and said inlet and exhaust openings, said plurality of compartments comprising four carrier compartments in quadrature relation which have operative positions wherein one compartment is registered with said opening, a second compartment is registered with said inlet and exhaust openings, a third compartment is closed and situated between said first and second compartments, and a fourth compartment is situated diametrically opposite said third compartment in registry with said cooling-air ports, each compartment having at least two electrical component retaining devices mounted on a carrier wall thereof which are insulated from each other, each carrier compartment having a connecting device provided with at least two circuit connectors mounted on said carrier wall, one circuit connector of each compartment being coupled to the component retaining devices of the same compartment, and the other circuit connector of each compartment being coupled to the component retaining devices of the diametrically closed compartment.

4. An oven apparatus for testing electrical components comprising a supporting housing having top, bottom, side and opposite end walls, two oven devices fixedly mounted inside said housing in side-by-side relationship; each oven device comprising a metallic enclosure of cylindrical shape having opposite end walls, a carrier coaxially mounted in said enclosure for rotation about the axis thereof, said carrier having four axially extending equally circumferentially spaced radial walls which slidingly engage the inner wall surface of said enclosure for the full distance between said enclosure end walls thereby providing four circumferentially spaced compartments within said enclosure, said compartments each having a floor therein which is secured to the respective radial walls thereof, said enclosure having an access opening therein which is sequentially registrable with individual ones of said compartments as said carrier is rotated, said enclosure end walls having axially opposite inlet and exhaust openings therein, respectively, in registry with a one of said compartments which is not in registry with said access opening, diametrically opposite said access opening, axially aligned cooling-air ports in the enclosure and walls which are registrable only with one compartment disposed between said access opening and said inlet and exhaust openings, the other compartment between said access opening and said inlet and exhaust openings being fully closed, intake and exhaust ducts connected to said inlet and exhaust openings, respectively, a heater and blower mechanism mounted in said intake duct, the ducts and enclosure being colinear; said two oven devices extending in parallel directions but being reversely arranged with the intake and exhaust ducts thereof being juxtaposed in pairs, one pair of intake and exhaust ducts opening through one end wall of said housing, the other pair of intake and exhaust ducts opening through the other end wall of said housing, two openings provided in the top wall of said housing in registry with the access openings, respectively, of the two enclosures, and means mounted on said housing for rotating selectively the carriers of the two oven devices.

5. The apparatus of claim 4 including in combination two U-shaped conduits, each conduit being detachably connected at its ends to a respective pair of intake and exhaust ducts, thereby providing a closed air-circulating system which includes both oven devices therein.

6. The apparatus of claim 4 wherein each compartment has mounted therein at least two component mounting terminals which are insulated from each other, each compartment also having mounted therein at least two circuit-connecting elements, one circuit-connecting element of each compartment being coupled to the terminals of the same compartment, the other circuit-connecting element of each compartment being coupled to the terminals of the diametrically opposite compartment, whereby external circuit connections to electrical components mounted in the various compartments may be selectively made.

References Cited in the file of this patent
UNITED STATES PATENTS

| | | |
|---|---|---|
| 648,684 | Davis | May 1, 1900 |
| 692,339 | Phillips | Feb. 4, 1902 |
| 1,728,371 | Shelton et al. | Sept. 17, 1929 |
| 1,955,301 | Lawson | Apr. 17, 1934 |
| 2,404,986 | Roth | July 30, 1946 |
| 2,495,612 | Trimble | Jan. 24, 1950 |
| 2,707,629 | Kennedy | May 3, 1955 |
| 2,982,913 | Berry | May 2, 1961 |
| 2,983,869 | Schmidt | May 9, 1961 |
| 3,063,878 | Wilson | Nov. 13, 1962 |
| 3,067,316 | Hill | Dec. 4, 1962 |

FOREIGN PATENTS

| | | |
|---|---|---|
| 273,894 | Italy | May 4, 1930 |

OTHER REFERENCES

Westinghouse, "New Information" Descr. Bull. 28–400, June 1944.